US012609443B2

(12) United States Patent
Senoo

(10) Patent No.: US 12,609,443 B2
(45) Date of Patent: Apr. 21, 2026

(54) ANTENNA ELEMENT AND ANTENNA DEVICE

(71) Applicant: JAPAN AVIATION ELECTRONICS INDUSTRY, LIMITED, Tokyo (JP)

(72) Inventor: Takuma Senoo, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 49 days.

(21) Appl. No.: 18/668,143

(22) Filed: May 18, 2024

(65) Prior Publication Data

US 2024/0405413 A1 Dec. 5, 2024

(30) Foreign Application Priority Data

May 31, 2023 (JP) ................................ 2023-089850

(51) Int. Cl.
*H01Q 1/36* (2006.01)
*H01Q 1/22* (2006.01)

(52) U.S. Cl.
CPC ................. *H01Q 1/36* (2013.01); *H01Q 1/22* (2013.01)

(58) Field of Classification Search
CPC .. H01Q 1/36; H01Q 1/22; H01Q 1/12; H01Q 9/0421; H01Q 9/0435
See application file for complete search history.

(56) References Cited

U.S. PATENT DOCUMENTS 7,649,498 B2 1/2010 Noro et al.
10,096,911 B2 * 10/2018 Tao ..................... H01Q 9/0421
10,476,143 B1 * 11/2019 Buccinna ................ H01Q 1/40
10,535,926 B2 1/2020 Lee
2017/0062933 A1 * 3/2017 Wu ..................... H01Q 9/0407
2021/0175626 A1 6/2021 Hashiguchi
2024/0128648 A1 4/2024 Senoo et al.
(Continued)

FOREIGN PATENT DOCUMENTS

CN 211670319 U 10/2020
CN 112467343 A 3/2021
EP 1536515 A1 6/2005
(Continued)

OTHER PUBLICATIONS

European Office Action dated May 22, 2025, issued in counterpart European Application No. 24177640.0.
(Continued)

*Primary Examiner* — David E Lotter
(74) *Attorney, Agent, or Firm* — Holtz, Holtz & Volek PC

(57) ABSTRACT

An antenna element comprises an upper conductor and at least one pair of legs. When the upper conductor is viewed along an up-down direction, one of the legs of the pair protrudes in a first orientation while a remaining one of the legs of the pair protrudes in a second orientation. The upper conductor is provided with at least one pair of recessed portions. When the upper conductor is viewed along the up-down direction, one of the recessed portions of the pair is recessed in the second orientation while a remaining one of the recessed portions of the pair is recessed in the first orientation. Each of the recessed portions is juxtaposed with the corresponding leg in a direction intersecting with a first direction which is defined by the first orientation and the second orientation.

12 Claims, 6 Drawing Sheets

(56) References Cited

U.S. PATENT DOCUMENTS

| | | | |
|---|---|---|---|
| 2024/0128649 | A1 | 4/2024 | Senoo et al. |

FOREIGN PATENT DOCUMENTS

| | | | |
|---|---|---|---|
| EP | 3214697 | A1 | 9/2017 |
| EP | 3832793 | A1 | 6/2021 |
| EP | 4354660 | A1 | 4/2024 |
| EP | 4354656 | B1 | 5/2025 |
| JP | 2008193204 | A | 8/2008 |
| JP | 2022150365 | A | 10/2022 |

OTHER PUBLICATIONS

Extended European Search Report (EESR) dated Oct. 15, 2024, issued in counterpart European Application No. 24177640.0.

Taiwanese Office Action (and an English language translation thereof) dated Aug. 28, 2025, issued in counterpart Taiwanese Application No. 113118887.

* cited by examiner

ANTENNA ELEMENT AND ANTENNA DEVICE

CROSS REFERENCE TO RELATED APPLICATIONS

This application is based on and claims priority under 35 U.S.C. § 119 to Japanese Patent Application No. JP2023-089850 filed May 31, 2023, the contents of which are incorporated herein in their entirety by reference.

BACKGROUND OF THE INVENTION

This invention relates to an antenna element and an antenna device using the antenna element.

As shown in FIG. 11, an antenna device 90 of JPA 2022-150365 (Patent Document 1) comprises a printed circuit board 94, a supporting portion 96 and an antenna element 98. Specifically, the printed circuit board 94 has a ground conductor 92. In addition, the antenna element 98 is formed of conductor and is fixed on the printed circuit board 94 via the supporting portion 96. The ground conductor 92 and the antenna element 98 are physically away from each other. The antenna element 98 has rotational symmetry in order to transmit/receive circularly polarized radio wave. The antenna element 98 is formed by bending a metal plate 99 shown in FIG. 12. As understood from FIGS. 11 and 12, a developed plan of the antenna element 98 has a shape with four-fold rotational symmetry.

When a manufacturer manufactures antenna elements, each of whose developed plan has a shape with four-fold rotational symmetry, by punching them out from a metal plate serving as base material, a large amount of scrap is generated from the metal plate. Thus, it is difficult to reduce material cost in a method of manufacturing such a conventional antenna element that is used for transmitting/receiving circularly polarized radio wave and that has such a developed plan.

SUMMARY OF THE INVENTION

It is an object of the present invention to provide an antenna element that is suitable for transmitting/receiving circularly polarized radio wave and that reduces material cost.

In order to reduce material cost, it is desirable for a developed plan of an antenna element, especially its outer periphery, to have a shape with line symmetry. However, if a developed plan of an antenna element is simply modified to have a shape with line symmetry, the modified antenna element lacks rotational symmetry and thereby axial ratio characteristics of an antenna device using the modified antenna element is degraded. As a result of study of the modified antenna element, the inventor of the present invention has found that a provision of a recessed portion in the vicinity of a leg can compensate the lack of rotational symmetry of the modified antenna element and thereby the axial ratio characteristics of the antenna device can be improved. Accordingly, a provision of a recessed portion at a predetermined location of an antenna element enables the antenna element to be designed in a manner that is suitable for transmitting/receiving circularly polarized radio wave and that reduces material cost.

The above describes the technique that the provision of the recessed portion in the antenna element, which is formed from a metal plate, improves axial ratio characteristics of the antenna device. This technique is also applicable to an antenna element other than the antenna element formed from the metal plate. If an antenna element itself is not required to have rotational symmetry, the antenna element can have somewhat increased design flexibility. In other words, a provision of a recessed portion at a predetermined location of an antenna element enables the antenna element to be designed in a manner that is suitable for transmitting/receiving circularly polarized radio wave and that has increased design flexibility. The present invention is based on this finding. Specifically, the present invention provides an antenna element as follows.

One aspect (first aspect) of the present invention provides an antenna element configured to be fixed on a printed circuit board with a ground conductor. The antenna element and the printed circuit board form an antenna device when the antenna element is fixed on the printed circuit board. The antenna element comprises an upper conductor and at least one pair of legs. When the upper conductor is viewed along an up-down direction, the upper conductor has an outer periphery whose shape is line-symmetrical with respect to a line passing through a center of the upper conductor. When the upper conductor is viewed along the up-down direction, one of the legs of the pair protrudes in a first orientation while a remaining one of the legs of the pair protrudes in a second orientation. The first orientation from the center of the upper conductor is opposite to the second orientation from the center of the upper conductor. Each of the legs of the pair extends downward in the up-down direction. The upper conductor is provided with at least one pair of recessed portions. The recessed portions of the pair correspond to the legs of the pair in a one-to-one relationship. When the upper conductor is viewed along the up-down direction, one of the recessed portions of the pair is recessed in the second orientation while a remaining one of the recessed portions of the pair is recessed in the first orientation. Each of the recessed portions is juxtaposed with the corresponding leg in a direction intersecting with a first direction which is defined by the first orientation and the second orientation.

Another aspect (second aspect) of the present invention provides an antenna device comprising the antenna element of the first aspect and the printed circuit board. The printed circuit board has the ground conductor. The antenna element is fixed on the printed circuit board.

As described above, the antenna element is configured as follows: when the upper conductor is viewed along the up-down direction, the one of the legs of the pair protrudes in the first orientation while the remaining one of the legs of the pair protrudes in the second orientation; the first orientation from the center of the upper conductor is opposite to the second orientation from the center of the upper conductor; each of the legs of the pair extends downward in the up-down direction; each of the recessed portions is juxtaposed with the corresponding leg in the direction intersecting with the first direction which is defined by the first orientation and the second orientation; and, when the upper conductor is viewed along the up-down direction, the one of the recessed portions of the pair is recessed in the second orientation while the remaining one of the recessed portions of the pair is recessed in the first orientation. Thus, the present invention can provide the antenna element suitable for transmitting/receiving circularly polarized radio wave, and can also provide the antenna device with improved axial ratio characteristics.

An appreciation of the objectives of the present invention and a more complete understanding of its structure may be had by studying the following description of the preferred embodiment and by referring to the accompanying drawings.

Figure 1:
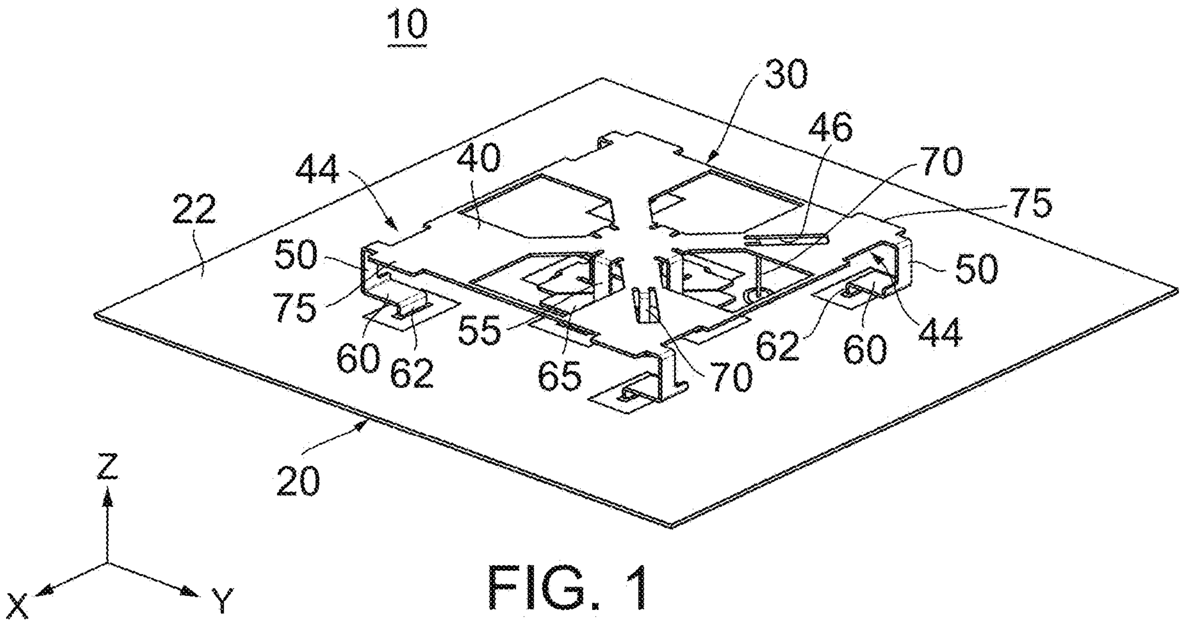
FIG. 1 is a perspective view showing an antenna device according to a first embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

First Embodiment

Figure 2:
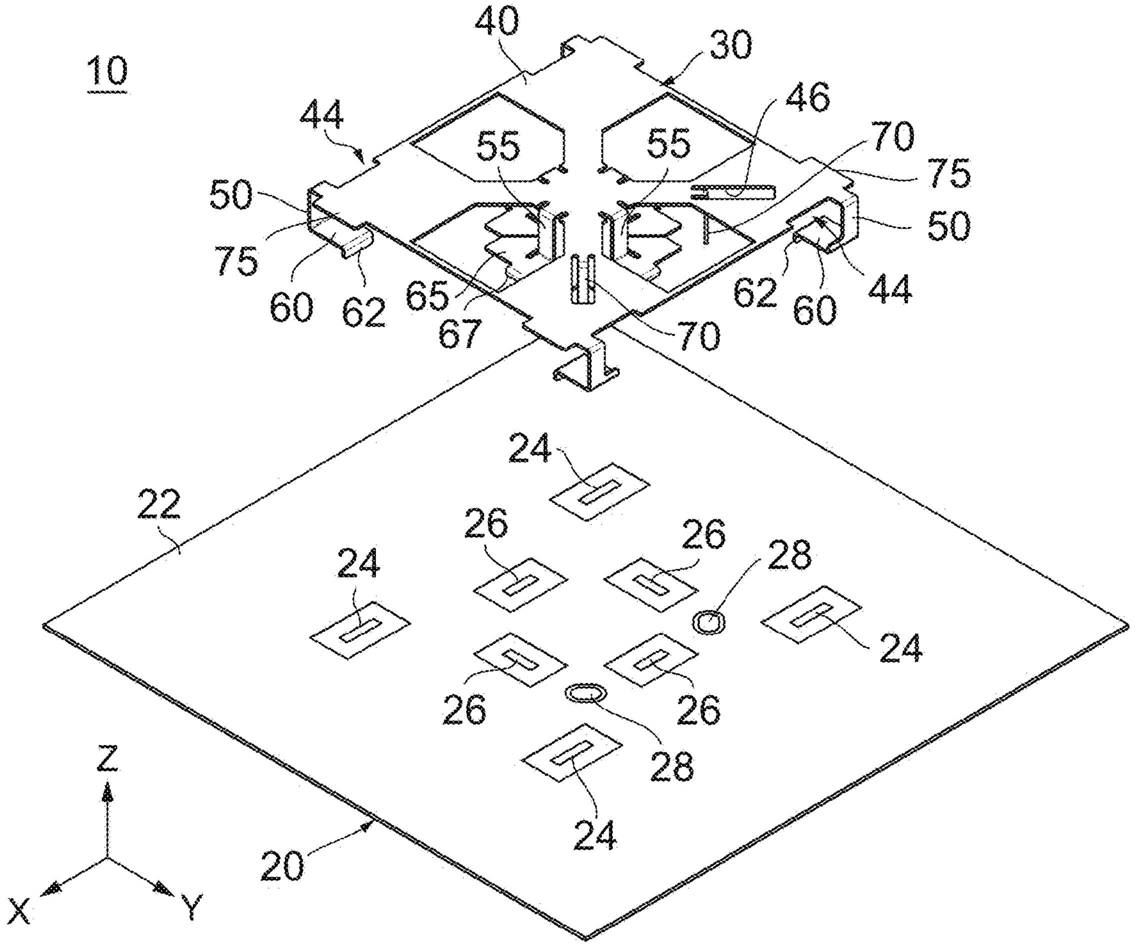
FIG. 2 is an exploded, perspective view showing the antenna device of FIG. 1.

Referring to FIGS. 1 and 2, an antenna device 10 according to a first embodiment of the present invention comprises a printed circuit board 20 and an antenna element 30. The printed circuit board 20 has a ground conductor 22. In detail, as shown in FIG. 2, the printed circuit board 20 has the ground conductor 22, solder pads 24, 26 and feeding pads 28. Specifically, each of the ground conductor 22, the solder pads 24, 26 and the feeding pads 28 is formed on a dielectric substrate. The ground conductor 22, the solder pads 24, 26 and the feeding pads 28 are separated from each other. Each of the solder pads 24, 26 of the present embodiment is left electrically floating. Specifically, each of the solder pads 24, 26 of the present embodiment is not electrically connected with any other part of the printed circuit board 20. In contrast, each of the feeding pads 28 is electrically connected to an outside part of the antenna device 10 by unshown means. However, the printed circuit board 20 is not limited thereto. Specifically, there is no restriction on the size and shape of the printed circuit board 20, provided that the printed circuit board 20 has the ground conductor 22. The printed circuit board 20 may have an additional ground conductor or another conductor.

As understood from FIGS. 1 and 2, the antenna element 30 is fixed on the printed circuit board 20. An explanation will be made later about a specific method of fixing the antenna element 30 on the printed circuit board 20.

As shown in FIGS. 1 to 4, the antenna element 30 comprises an upper conductor 40, legs 50, lower conductors 60, feeding portions 70 and stubs 75. The antenna element 30 of the present embodiment is formed from a single metal plate. In detail, as described later, the antenna element 30 of the present embodiment is integrally formed by punching out a blank from the metal plate serving as base material, followed by bending the blank. However, the present invention is not limited thereto. Specifically, the antenna element 30 may be formed by Laser Direct Structuring (LDS) Technology.

Figure 4:
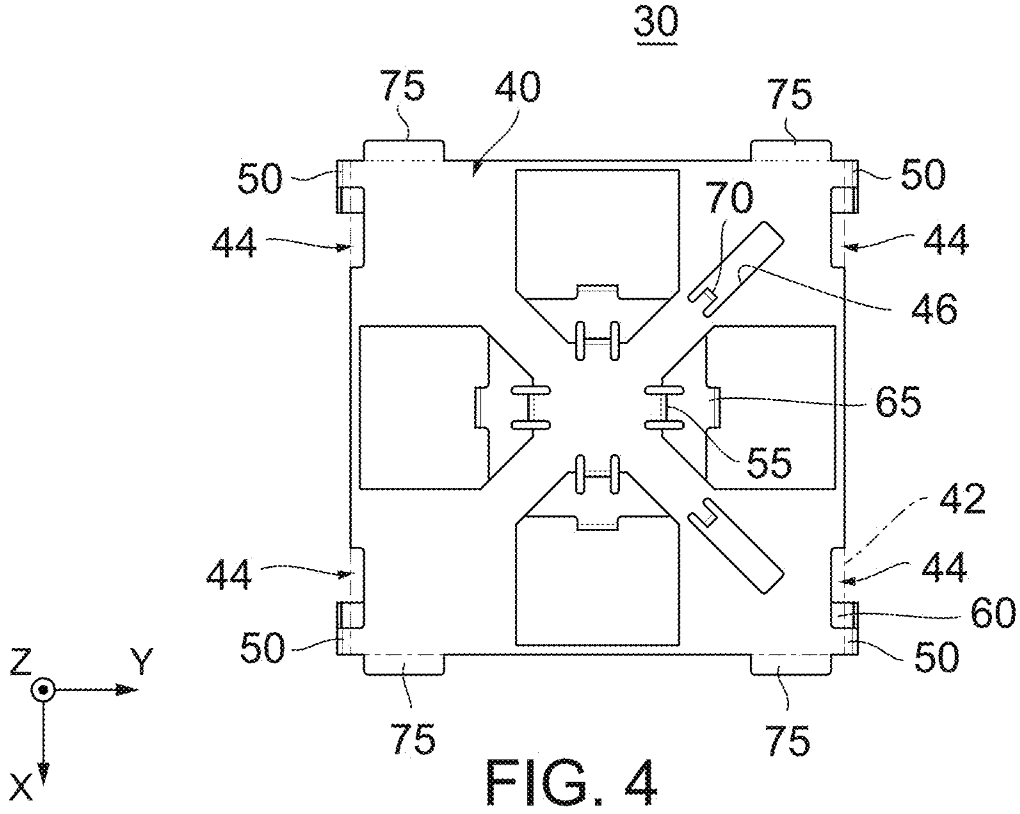
FIG. 4 is a top view showing the antenna element of FIG. 3.

As understood from FIG. 4, the upper conductor 40 of the present embodiment extends in a predetermined plane perpendicular to an up-down direction. When the upper conductor 40 is viewed along the up-down direction, the upper conductor 40 has an outer periphery whose shape is line-symmetrical with respect to a line passing through a center of the upper conductor 40. In the present embodiment, the up-down direction is a Z-direction. Specifically, it is assumed that upward is a positive Z-direction while downward is a negative Z-direction. The predetermined plane is a horizontal plane, or an XY-plane. Referring to FIGS. 1 and 4, the predetermined plane of the present embodiment is a plane parallel to an upper surface of the printed circuit board 20. The upper conductor 40 of the present embodiment extends parallel to the upper surface of the printed circuit board 20. However, the upper conductor 40 is not limited thereto. Specifically, the upper conductor 40 should extend, at least in part, in a direction parallel to the upper surface of the printed circuit board 20.

Here, a specific imaginary rectangle 42 is assumed as follows: the specific imaginary rectangle 42 is positioned on the predetermined plane; the specific imaginary rectangle 42 has four sides; the specific imaginary rectangle 42 encloses the upper conductor 40; and the specific imaginary rectangle 42 is of minimum area. As understood from FIGS. 4 and 5, the specific imaginary rectangle 42 of the present embodiment is a square. In other words, the specific imaginary rectangle 42 has four-fold rotational symmetry. The antenna element 30 with the upper conductor 40, which is enclosed by the specific imaginary rectangle 42 fulfilling the above conditions, is essentially suitable for communication using circularly polarized radio wave. However, the specific imaginary rectangle 42 is not limited to the square. Specifically, the specific imaginary rectangle 42 may be an oblong rectangle, provided that a lack of rotational symmetry of the antenna element 30 is compensated.

Figure 3:
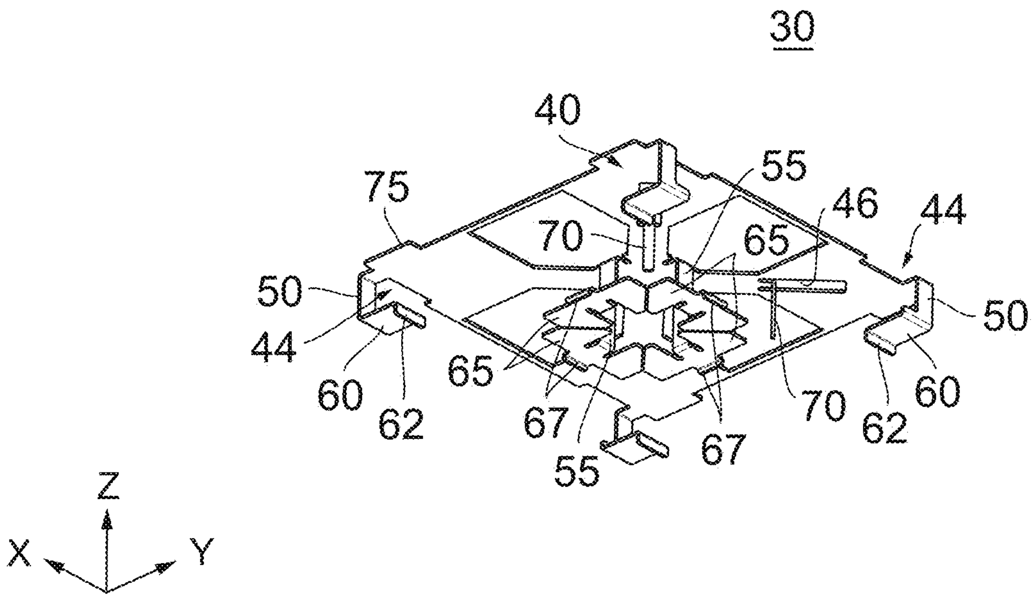
FIG. 3 is a bottom, perspective view showing an antenna element which is included in the antenna device of FIG. 2.

As shown in FIGS. 2 and 3, the number of the feeding portions 70 of the present embodiment is two. As understood from FIGS. 1 and 2, the feeding portions 70 are connected to the feeding pads 28, respectively. As understood from FIGS. 2 and 4, each of the feeding portions 70 is formed by bending a part of the upper conductor 40. The upper conductor 40 is formed also with slots 46 as a result of the formation of the feeding portions 70. As understood from FIG. 4, when the upper conductor 40 is viewed along the up-down direction, an imaginary line connecting the center of the upper conductor 40 with one of the feeding portions 70 and an imaginary line connecting the center of the upper conductor 40 with a remaining one of the feeding portions 70 are at 90 degrees to each other. Accordingly, the antenna element 30 can achieve communication, which uses circularly polarized radio wave, by being fed at two points, namely the feeding portions 70.

Referring to FIGS. 1 to 4, the antenna element 300 of the present embodiment comprises four of the legs 50. As understood from FIG. 4, the specific imaginary rectangle 42 includes two sides each of which is perpendicular to a Y-direction, and each of two of the legs 50 extends from one of the two sides of the specific imaginary rectangle 42 while each of remaining two of the legs 50 extends from a remaining one of the two sides of the specific imaginary rectangle 42. In other words, the antenna element 30 of the present embodiment comprises two pairs each consisting of the legs 50. In each of the two pairs of the legs 50, one of the legs 50 is positioned on one of the two sides of the specific imaginary rectangle 42, which is positioned beyond the center of the upper conductor 40 in a first orientation, while a remaining one of the legs 50 is positioned on a remaining one of the two sides of the specific imaginary rectangle 42, which is positioned beyond the center of the upper conductor 40 in a second orientation. In the present embodiment, the first orientation is a positive Y-direction, or rightward in FIG. 4, while the second orientation is a negative Y-direction, or leftward in FIG. 4.

When the upper conductor 40 is viewed along the up-down direction, one of the legs 50 of each of the pairs protrudes in the first orientation while a remaining one of the legs 50 of each of the pairs protrudes in the second orientation. The first orientation from the center of the upper conductor 40 is opposite to the second orientation from the center of the upper conductor 40. Each of the legs 50 of each of the pairs extends downward in the up-down direction. Specifically, each of two of the legs 50 of the present embodiment protrudes from the upper conductor 40 in the positive Y-direction and then extends in the negative Z-direction, and each of remaining two of the legs 50 of the present embodiment protrudes from the upper conductor 40 in the negative Y-direction and then extends in the negative Z-direction.

As described above, the antenna element 30 of the present embodiment is configured as follows: when the upper conductor 40 is viewed along the up-down direction, each of the two legs 50 extends from a positive Y-side of the specific imaginary rectangle 42 while each of the remaining two legs 50 extends from a negative Y-side of the specific imaginary rectangle 42. However, the present invention is not limited thereto. For example, the antenna element 30 may be configured as follows: when the upper conductor 40 is viewed along the up-down direction, one of the legs 50 of a pair extends from the positive Y-side of the specific imaginary rectangle 42 while a remaining one of the legs 50 of the pair extends from the negative Y-side of the specific imaginary rectangle 42. In other words, the antenna element 30 should comprise at least one pair of the legs 50.

Referring to FIGS. 1 to 4, the upper conductor 40 is provided with four recessed portions 44. The recessed portions 44 correspond to the legs 50 in a one-to-one relationship. Specifically, in the present embodiment, the number of the recessed portions 44 is equal to the number of the legs 50. As shown in FIG. 4, the leg 50 and the corresponding recessed portion 44 are positioned on the same side among the four sides of the specific imaginary rectangle 42.

In detail, as understood from FIG. 4, two sides of the specific imaginary rectangle 42 are perpendicular to the Y-direction. One of the two sides is provided with two of the recessed portions 44 while a remaining one of the two sides is provided with remaining two of the recessed portions 44. In other words, the upper conductor 40 of the present embodiment is provided with two pairs each consisting of the recessed portions 44.

An object of the provision of the recessed portions 44 is to compensate the lack of the rotational symmetry of the antenna element 30 which is caused by a linearly symmetrical arrangement of the legs 50. In order to achieve this object, each of the recessed portions 44 is juxtaposed with the corresponding leg 50 in a direction intersecting with a first direction which is defined by the first orientation and the second orientation, or with the Y-direction. It is essential for the antenna element 30 of the present embodiment to be configured so that each of the recessed portions 44 is juxtaposed with the corresponding leg 50 in the direction. By this configuration, the antenna element 30 can provide a greatly improved possibility of achieving communication using circularly polarized radio wave. Especially, in order to obtain better compensation of the lack of the rotational symmetry of the antenna element 30, the antenna element 30 of the present embodiment is configured so that each of the recessed portions 44 is arranged adjacent to the corresponding leg 50 in a second direction perpendicular to the first direction defined by the first orientation and the second orientation, or to the Y-direction.

In the present embodiment, the recessed portions 44 are arranged similar to the legs 50. Specifically, each of two of the recessed portions 44 is provided at the positive Y-side of the specific imaginary rectangle 42 while each of remaining two of the recessed portions 44 is provided at the negative Y-side of the specific imaginary rectangle 42. However, the present invention is not limited thereto. If, for example, the antenna element 30 has the only single pair of the legs 50 as described above, the antenna element 30 should be configured as follows; when the upper conductor 40 is viewed along the up-down direction, one of the recessed portions 44 of a pair is provided at the positive Y-side of the specific imaginary rectangle 42 while a remaining one of the recessed portions 44 of the pair is provided at the negative Y-side of the specific imaginary rectangle 42. In other words, the upper conductor 40 should be provided with at least one pair of the recessed portions 44 according to the legs 50.

As shown in FIG. 4, each of the two recessed portions 44, which is provided at the positive Y-side of the specific imaginary rectangle 42, is recessed in the negative Y-direction, and each of the remaining two recessed portions 44, which is provided at the negative Y-side of the specific imaginary rectangle 42, is recessed in the positive Y-direction. Specifically, when the upper conductor 40 is viewed along the up-down direction, the former recessed portion 44 is recessed in the second orientation while the latter recessed portion 44 is recessed in the first orientation. In other words, the former recessed portion 44 and the latter recessed portion 44 are recessed in orientations opposite to each other.

As apparent from FIG. 4, each of the recessed portions 44 has a wide shape as follows: each of the recessed portions 44 has a size in the first direction and another size in the second direction perpendicular to the first direction, and the size of each of the recessed portions 44 in the second direction is greater than the size of each of the recessed portions 44 in the first direction. In other words, the size of each of the recessed portions 44 in an X-direction is greater than the size of each of the recessed portions 44 in the Y-direction. In detail, the Y-direction is a direction in which each of the recessed portions 44 is recessed, the X-direction is a direction perpendicular to the direction in which each of the recessed portions 44 is recessed, and the size of each of the recessed portions 44 in the latter direction is greater than the size of each of the recessed portions 44 in the former direction. As understood from FIG. 4, the antenna element 30 of the present embodiment is configured so that a width of each of the recessed portions 44 is greater than a width of the corresponding leg 50. It is noted that the width of the recessed portion 44 is its size in the X-direction while the width of the leg 50 is its size in the X-direction. Good compensation of the lack of the rotational symmetry of the antenna element 30 can be obtained most effectively when each of the recessed portions 44 has the wide shape as described above. However, the shape of the recessed portion 44 is not limited thereto. The recessed portion 44 may have, for example, a narrow shape so that the size of the recessed portion 44 in the X-direction is smaller than the size of the recessed portion 44 in the Y-direction. A shape of a periphery of the recessed portion 44 is not limited to a rectangle, but also may be a shape including a curved portion, such as a semi-circular shape or a semi-elliptical shape.

As understood from FIGS. 2 and 3, the lower conductors 60 of the present embodiment extend from the legs 50, respectively. Specifically, each of the lower conductors 60 extends in a direction parallel to the upper surface of the printed circuit board 20, and each of the lower conductors 60 is positioned away from the upper conductor 40 in the up-down direction. In other words, each of the lower conductors 60 of the present embodiment extends parallel to the upper conductor 40. Accordingly, the upper conductor 40 and each of the lower conductors 60 form a capacitor. The shapes and arrangement of the lower conductors 60 are not limited thereto, provided that the lower conductor 60 and the upper conductor 40 form a capacitor. However, in order to suppress a variation of its capacitance due to a dimensional tolerance variation of the antenna element 30, each of the lower conductors 60 should extend, at least in part, in the direction parallel to the upper surface of the printed circuit board 20.

The antenna element 30 of the present embodiment comprises fixed portions 62 which extend downward from the lower conductors 60, respectively. Specifically, as understood from FIGS. 1 and 2, the fixed portions 62 are soldered and fixed to the solder pads 24, respectively, of the printed circuit board 20. Accordingly, the ground conductor 22 and each of the lower conductors 60 form another capacitor.

Referring to FIGS. 1 to and 4, the antenna element 30 of the present embodiment has four of the stubs 75. The specific imaginary rectangle 42 includes two sides each of which is perpendicular to the X-direction, and each of two of the stubs 75 extends from one of the two sides of the specific imaginary rectangle 42 while each of remaining two of the stubs 75 extends from a remaining one of the two sides of the specific imaginary rectangle 42. In other words, the antenna element 30 of the present embodiment comprises two pairs each consisting of the stubs 75. In each of the two pairs of the stubs 75, one of the stubs 75 is positioned on one of the two sides of the specific imaginary rectangle 42, which is positioned beyond the center of the upper conductor 40 in a third orientation, while a remaining one of the stubs 75 is positioned on a remaining one of the two sides of the specific imaginary rectangle 42, which is positioned beyond the center of the upper conductor 40 in a fourth orientation. Specifically, the third orientation from the center of the upper conductor 40 is opposite to the fourth orientation from the center of the upper conductor 40. In the present embodiment, the third orientation is the positive X-direction, or downward in FIG. 4, while the fourth orientation is the negative X-direction, or upward in FIG. 4. Specifically, the X-direction is the second direction which is defined by the third orientation and the fourth orientation, and the second direction is perpendicular to the first direction defined by the first orientation and the second orientation, or to the Y-direction.

As shown in FIG. 4, one of the stubs 75 of each of the pairs extends in the third orientation from the outer periphery of the upper conductor 40 while a remaining one of the stubs 75 of each of the pairs extends in the fourth orientation from the outer periphery of the upper conductor 40, and each of the stubs 75 does not overlaps with the upper conductor 40 when the upper conductor 40 is viewed along the up-down direction. Specifically, each of the stubs 75 extends outward from the upper conductor 40 when the upper conductor 40 is viewed along the up-down direction. Each of the stubs 75 of the present embodiment extends in the horizontal plane similar to the upper conductor 40. However, the present invention is not limited thereto. Specifically, the stub 75 may extend in a direction intersecting somewhat with the horizontal plane, provided that the stub 75 does not overlaps with the upper conductor 40 when the upper conductor 40 is viewed along the up-down direction.

An object of the provision of the stubs 75 is to secondarily compensate the lack of the rotational symmetry of the antenna element 30. In order to achieve this object, it is desirable that the stub 75 is arranged in the vicinity of the leg 50. As described above, the compensation of the lack of the rotational symmetry of the antenna element 30 is achieved mainly by the recessed portions 44. Accordingly, the stubs 75 are not essential to the antenna element 30. However, the provision of the stubs 75 enables the antenna element 30 to provide a further improved possibility of achieving communication using circularly polarized radio wave. Especially, each of the stubs 75 of the present embodiment has a wide shape as follows: each of the stubs 75 has a size in the first direction and another size in the second direction; and the size of each of the stubs 75 in the first direction is greater than the size of each of the stubs 75 in the second direction. In other words, the size of each of the stubs 75 in the Y-direction is greater than the size of each of the stubs 75 in the X-direction. In detail, the X-direction is a direction in which each of the stubs 75 extends, the Y-direction is a direction perpendicular to the direction in which each of the stubs 75 extends, and the size of each of the stubs 75 in the latter direction is greater than the size of each of the stubs 75 in the former direction. The stubs 75 of the present embodiment correspond to the legs 50, respectively. However, the present invention is limited thereto. If, for example, the antenna element 30 is provided with two pairs of the legs 50 similar to the present embodiment, the antenna element 30 may be provided with a single pair of the stubs 75 each of which extends long in the Y-direction so that opposite ends of each of the stubs 75 reach the vicinities of the legs 50. If the recessed portions 44 adequately compensate the lack of the rotational symmetry of the antenna element 30, the antenna element 30 may be provided with no stub 75.

As understood from FIGS. 2 and 3, the antenna element 30 of the present embodiment further has additional legs 55, additional lower conductors 65 and fixed portions 67. The additional legs 55, the additional lower conductors 65 and the fixed portions 67 are formed by punching and bending parts of the upper conductor 40. In the present embodiment, none of the additional legs 55, the additional lower conductors 65 and the fixed portions 67 affect the outer peripheral shape of the upper conductor 40.

Each of the additional legs 55 extends downward in the up-down direction from a location which is closer to the center of the upper conductor 40. The additional lower conductors 65 extend in a direction parallel to the upper surface of the printed circuit board 20 from the additional legs 55, respectively. Each of the additional lower conductors 65 is positioned away from the upper conductor 40 in the up-down direction. In other words, each of the additional lower conductors 65 of the present embodiment extends parallel to the upper conductor 40. Accordingly, the upper conductor 40 and each of the additional lower conductors 65 form a capacitor. The shapes and arrangement of the additional lower conductors 65 are not limited thereto, provided that the upper conductor 40 and each of the additional lower conductors 65 form a capacitor. However, in order to suppress a variation of its capacitance due to a dimensional tolerance variation of the antenna element 30, each of the additional lower conductors 65 should extend, at least in part, in the direction parallel to the upper surface of the printed circuit board 20.

In the present embodiment, the fixed portions 67 extend downward from the additional lower conductors 65, respectively. Specifically, as understood from FIGS. 1 and 2, the fixed portions 67 are soldered and fixed to the solder pads 26, respectively, of the printed circuit board 20. Accordingly, the ground conductor 22 and each of the additional lower conductors 65 form another capacitor.

As described above, the upper conductor 40 and each of the lower conductors 60 form the capacitor while the upper conductor 40 and each of the additional lower conductors 65 form the capacitor. Additionally, the ground conductor 22 and each of the lower conductors 60 form the capacitor while the ground conductor 22 and each of the additional lower conductors 65 form the capacitor. The capacitors, which are formed by the lower conductors 60, the upper conductor 40 and the ground conductor 22, contribute mainly to miniaturization of the antenna element 30 which has a predetermined resonant frequency. The capacitors, which are formed by the additional lower conductors 65, the upper conductor 40 and the ground conductor 22, contribute mainly to adjustment of the resonant frequency of the antenna element 30. However, the present invention is not limited thereto. Specifically, instead of comprising these capacitors, the antenna element 30 may comprise a capacitor element, such as a tip capacitor, which connects between the leg 50 and the ground conductor 22 or between the additional leg 55 and the ground conductor 22.

Figure 5:
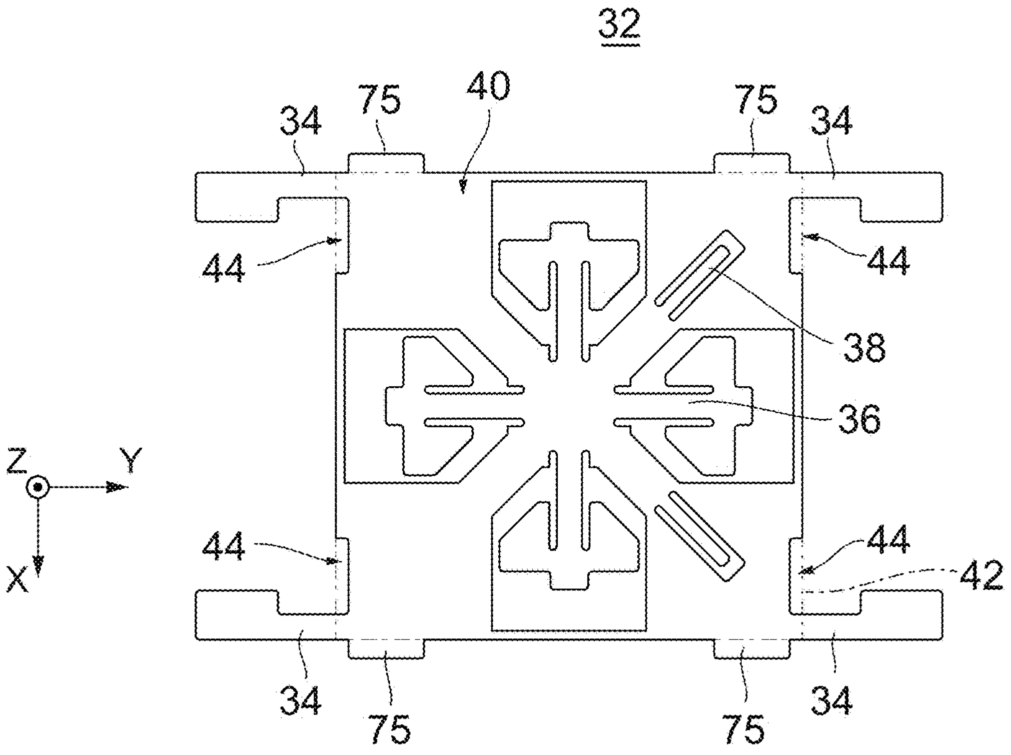
FIG. 5 is a top view showing a developed plan of the antenna element of FIG. 4.

The antenna element 30 with the aforementioned configuration is formed by bending a stamped metal 32 shown in FIG. 5. That is, as shown in FIG. 5, a developed plan of the antenna element 30 of the present embodiment has an outer peripheral shape with line symmetry.

The stamped metal 32 shown therein is a blank which is obtained by punching the metal plate serving as the base material. Specifically, the stamped metal 32 has four first portions 34, four second portions 36 and two third portions 38. Referring to FIGS. 4 and 5, each of the first portions 34 is a portion which is configured to be bent to form the leg 50 and the lower conductor 60. Each of two of the first portions 34 extends in the first orientation, or in the positive Y-direction, from the upper conductor 40, and each of remaining two of the first portions 34 extends in the second orientation, or in the negative Y-direction, from the upper conductor 40. Each of the second portions 36 is a portion which is configured to be bent to form the additional leg 55 and the additional lower conductor 65. Each of the third portions 38 is a portion which is configured to be bent to form the feeding portion 70. One of the two third portions 38 is provided on an imaginary line which extends from a center of the specific imaginary rectangle 42, namely the center of the upper conductor 40, toward one of vertices of the specific imaginary rectangle 42. Additionally, a remaining one of the two third portions 38 is provided on another imaginary line which extends from the center of the specific imaginary rectangle 42, namely, the center of the upper conductor 40, toward another of the vertices of the specific imaginary rectangle 42. In order to increase the rotational symmetry of the antenna element 30, the stamped metal 32 may be provided, if necessary, with a dummy slot corresponding to the slot 46, wherein the dummy slot is located on an imaginary line which extends from the center of the specific imaginary rectangle 42, namely, the center of the upper conductor 40, toward another of the vertices of the specific imaginary rectangle 42 and on which none of the third portions 38 are provided.

As described above, the developed plan of the antenna element 30 of the present embodiment has the outer peripheral shape with line symmetry. When a manufacturer manufactures the antenna elements 30, each of whose developed plan has the outer peripheral shape with the line symmetry, by punching them out from the metal plate serving as the base material, a less amount of scrap is generated from the metal plate in comparison with a case where a manufacturer manufactures antenna elements, each of whose developed plan has an outer peripheral shape with rotational symmetry, in the same manner. Accordingly, the antenna element 30 of the present embodiment can reduce material cost. Since the outer peripheral shape of the developed plan of the antenna element 30 of the present embodiment is not required to have rotational symmetry, the antenna element 30 of the present embodiment can have increased design flexibility.

If linear symmetry in the outer peripheral shape of the developed plan of the antenna element 30 were achieved simply by a protrusion of one of the legs 50 of each of the pairs in the first orientation, or in the positive Y-direction, and a protrusion of a remaining one of the legs 50 of each of the pairs in the second orientation, or in the negative Y-direction, the thus-configured antenna element 30 would lack rotational symmetry and thereby an antenna device 10 using the thus-configured antenna element 30 could not have improved axial ratio characteristics. In contrast, the antenna element 30 of the present embodiment is configured as follows: one of the recessed portions 44 of each of the two pairs, which is recessed in the second orientation, is juxtaposed with the corresponding leg 50 protruding in the first orientation; and a remaining one of the recessed portions 44 of each of the two pairs, which is recessed in the first orientation, is juxtaposed with the corresponding leg 50 protruding in the second orientation. This configuration compensates the lack of the rotational symmetry of the antenna element 30. Additionally, the provision of the stubs 75 secondarily compensate the lack of the rotational symmetry of the antenna element 30. Accordingly, the antenna element 30 of the present embodiment is suitable for communication using circularly polarized radio wave, and the antenna device 10 using the antenna element 30 of the present embodiment can have improved axial ratio characteristics. It is noted that the sizes and shapes of the aforementioned recessed portion 44 and the stub 75 has no restriction other than those mentioned above. Specifically, the sizes and shapes of the recessed portion 44 and the stub 75 should be appropriately adjusted so that an expected antenna device 10 can have improved axial ratio characteristics at an expected frequency band.

Second Embodiment

Figure 6:
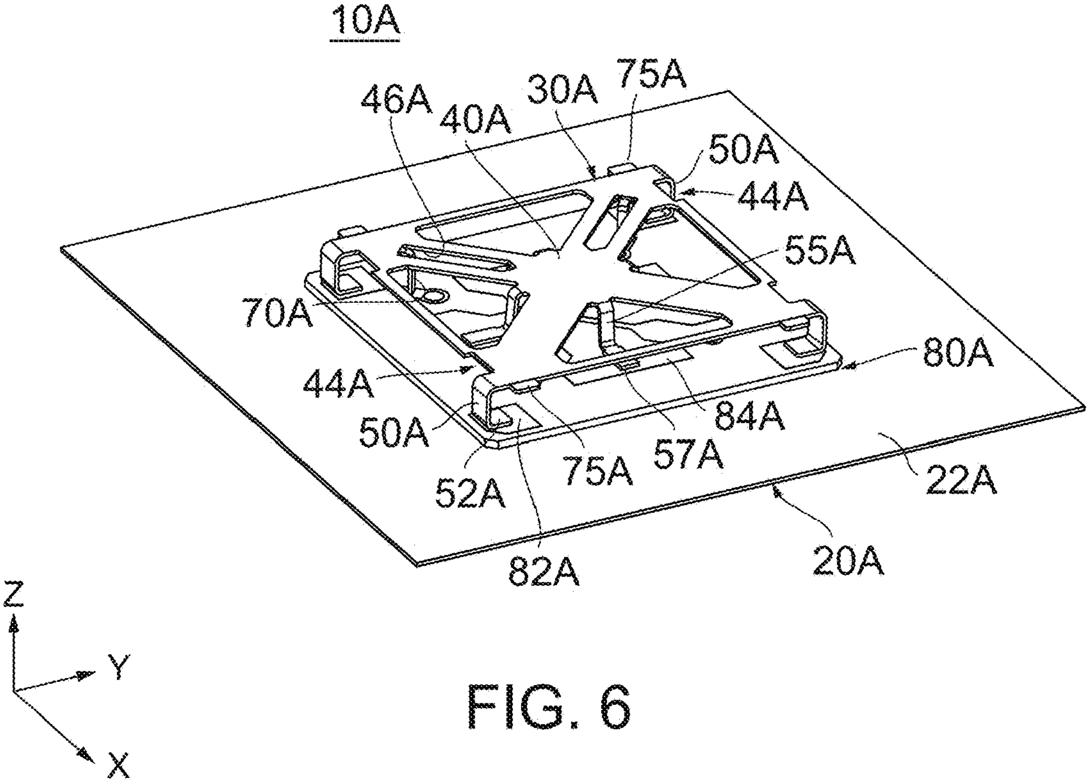
FIG. 6 is a perspective view showing an antenna device according to a second embodiment of the present invention.

Referring to FIG. 6, an antenna device 10A according to a second embodiment of the present invention comprises an auxiliary element 80A in addition to a printed circuit board 20A and an antenna element 30A. The printed circuit board 20A has a ground conductor 22A. Specifically, the printed circuit board 20A has the ground conductor 22A which is formed on a dielectric substrate. There is no restriction on the size, shape and structure of the printed circuit board 20A, provided that the printed circuit board 20A comprises the ground conductor 22A.

In the present embodiment, the antenna element 30A is fixed on the printed circuit board 20A via the auxiliary element 80A. The antenna element 30A of the present embodiment has a structure similar to that of the antenna element 30 of the first embodiment shown in each of FIGS. 1 to 4. Accordingly, components of the antenna element 30A of the present embodiment that are same as those of the antenna element 30 of the first embodiment are referred by using reference signs which includes the letter "A" following the same reference signs of the antenna element 30 of the first embodiment. For example, an upper conductor of the antenna element 30A of the present embodiment is referred by using a reference sign "40A" which includes the letter "A" following the same reference sign "40" of the upper conductor of the antenna element 30 of the first embodiment. Thus, hereinafter, descriptions will be omitted or simplified about the components of the antenna element 30A of the present embodiment that are understood to be same as those of the first embodiment by the reference signs.

The antenna element 30A of the present embodiment is dissimilar to the antenna element 30 of the aforementioned first element in that the antenna element 30A of the present embodiment comprises none of a lower conductor and an additional lower conductor. Since the antenna element 30A comprises none of the lower conductor and the additional lower conductor, fixed portions 52A extend directly from the legs 50A, respectively, while fixed portions 57A extend directly from the additional legs 55A, respectively.

Figure 7:
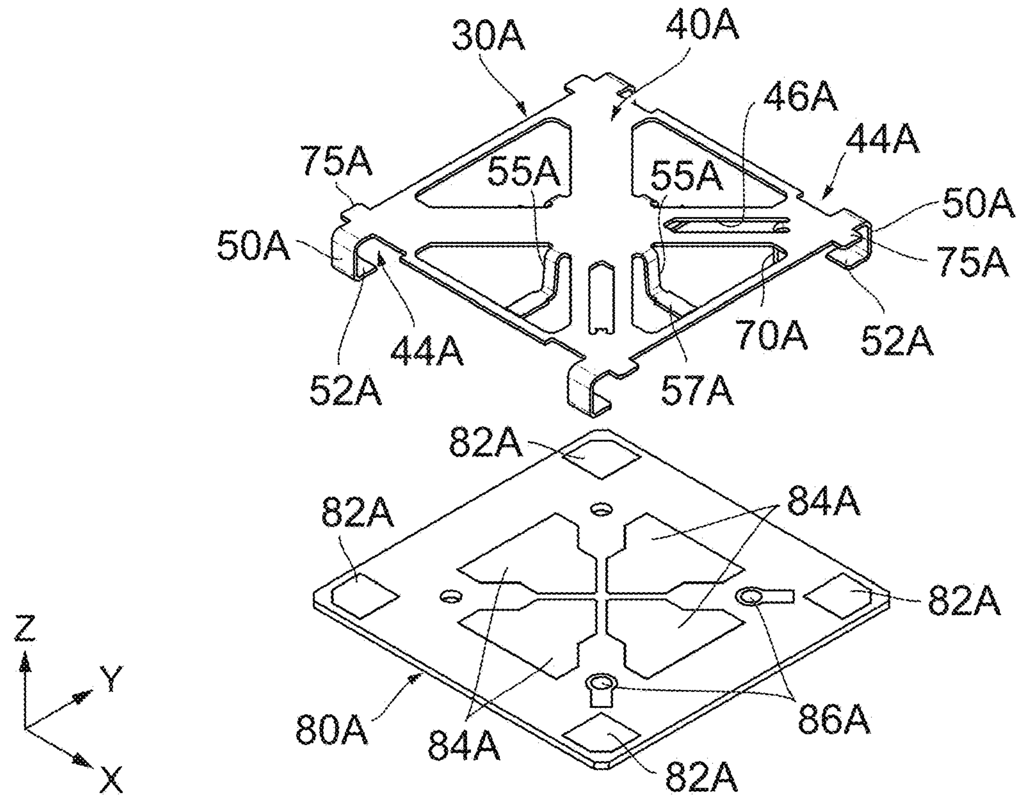
FIG. 7 is a perspective view showing an antenna element and an auxiliary element which are included in the antenna device of FIG. 6.
Figure 8:
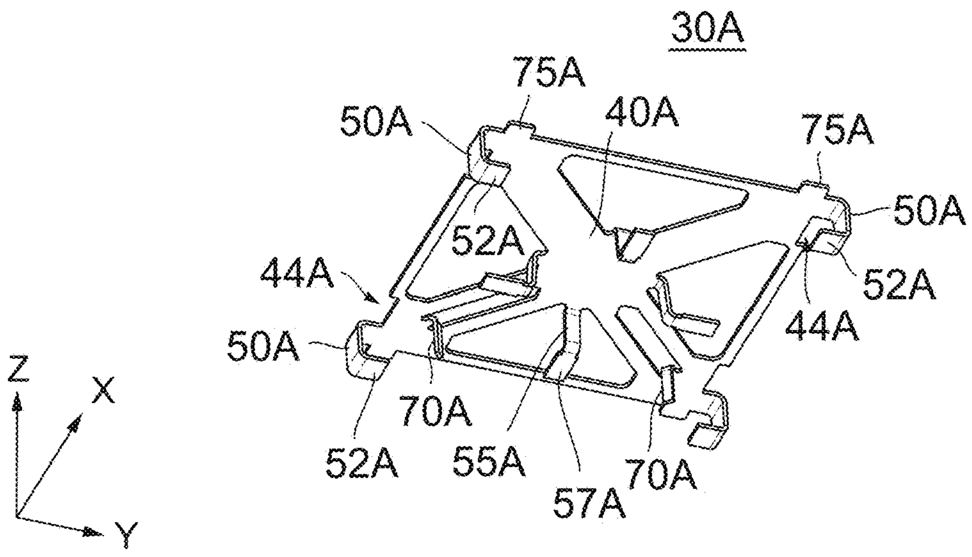
FIG. 8 is a bottom, perspective view showing the antenna element of FIG. 7.

As understood from FIG. 6, the auxiliary element 80A of the present embodiment is an auxiliary printed circuit board on which the antenna element 30A is mounted and which is fixed on the printed circuit board 20A. As shown in FIG. 7, the auxiliary element 80A has auxiliary first lower electrodes 82A, auxiliary second lower electrodes 84A and feeding pads 86A. Specifically, the auxiliary first lower electrodes 82A, the auxiliary second lower electrodes 84A and the feeding pads 86A are formed on a dielectric substrate. The auxiliary first lower electrodes 82A, the auxiliary second lower electrodes 84A and the feeding pads 86A are separated from each other. Each of the auxiliary first lower electrodes 82A and the auxiliary second lower electrodes 84A of the present embodiment is left electrically floating. Specifically, each of the auxiliary first lower electrodes 82A and the auxiliary second lower electrodes 84A of the present embodiment is not electrically connected with any other part of the auxiliary element 80A. In contrast, each of the feeding pads 86A is electrically connected to an outside part of the antenna device 10A by unshown means. In addition to the aforementioned configuration, the auxiliary element 80A may further comprise a ground pattern which covers the whole of its lower surface.

The auxiliary first lower electrodes 82A of FIG. 7 correspond to the lower conductors 60, respectively, of FIG. 2. As understood from FIGS. 6 and 7, the upper conductor 40A and each of the auxiliary first lower electrodes 82A form a capacitor when the fixed portions 52A are fixed to the auxiliary first lower electrodes 82A, respectively. The ground conductor 22A and each of the auxiliary first lower electrodes 82A form another capacitor when the auxiliary element 80A is fixed on the printed circuit board 20A.

The auxiliary second lower electrodes 84A of FIG. 7 correspond to the additional lower conductors 65, respectively, of FIG. 2. As understood from FIGS. 6 and 7, the upper conductor 40A and each of the auxiliary second lower electrodes 84A form a capacitor when the fixed portions 57A are fixed to the auxiliary second lower electrodes 84A, respectively. The ground conductor 22A and each of the auxiliary second lower electrodes 84A form another capacitor when the auxiliary element 80A is fixed on the printed circuit board 20A.

Figure 10:
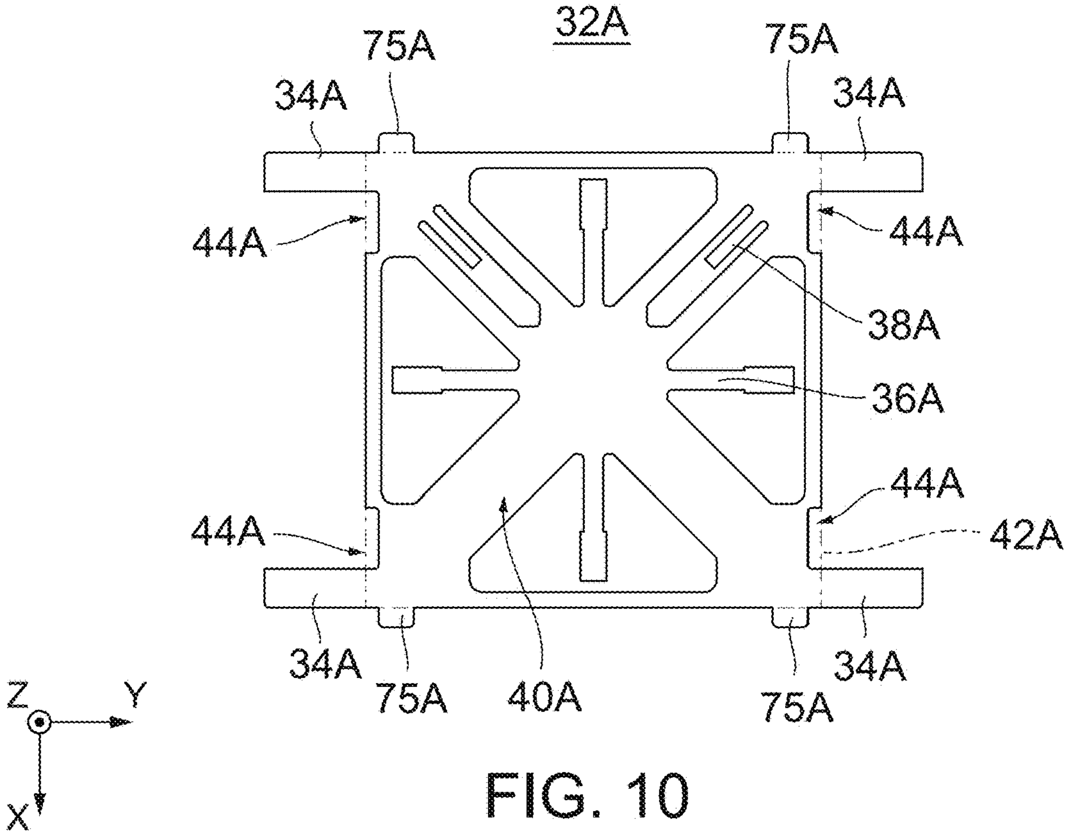
FIG. 10 is a top view showing a developed plan of the antenna element of FIG. 9.
Figure 11:
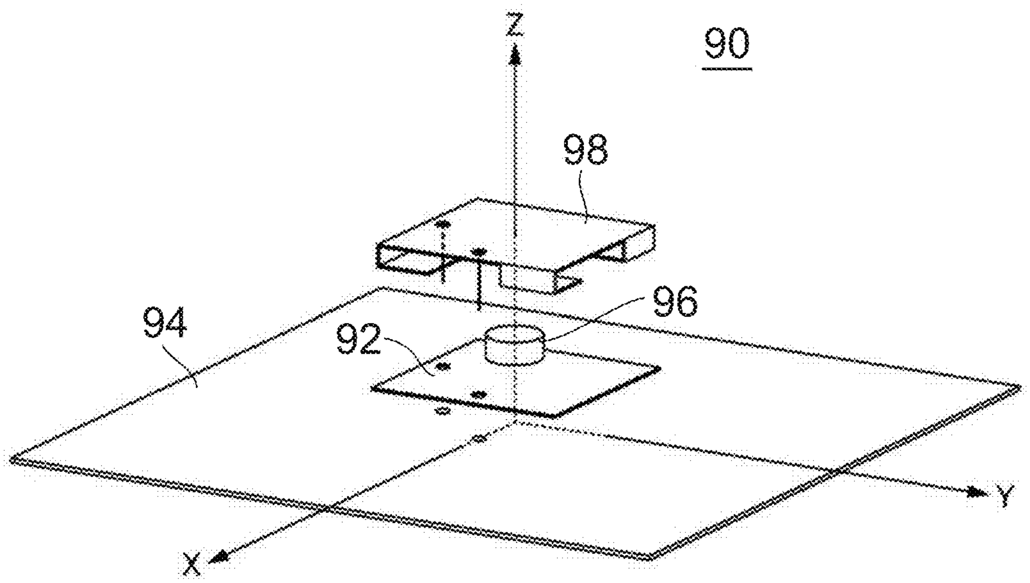
FIG. 11 PRIOR ART
FIG. 11 is an exploded, perspective view showing an antenna device of Patent Document 1.
Figure 12:
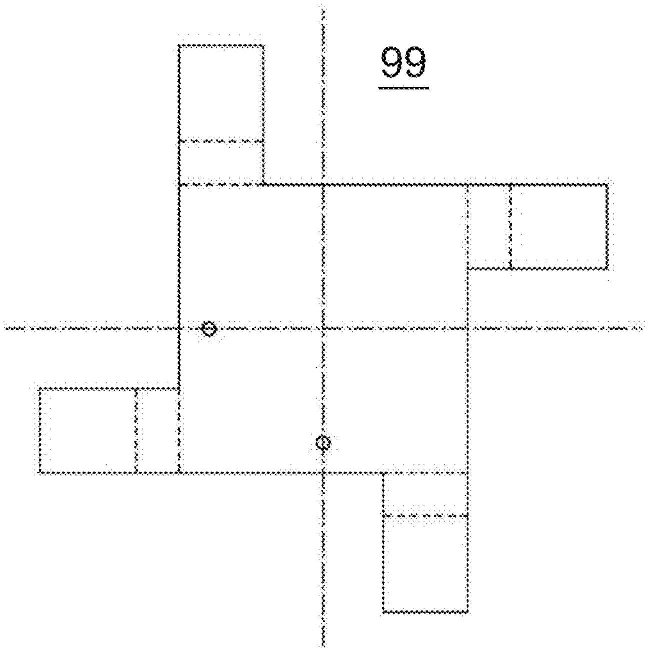
FIG. 12 PRIOR ART
FIG. 12 is a top view showing a developed plan of an antenna element of Patent Document 1.

The antenna element 30A of the present embodiment is formed by bending a stamped metal 32A shown in FIG. 10. That is, as shown in FIG. 10, a developed plan of the antenna element 30A of the present embodiment has an outer peripheral shape with line symmetry.

Figure 9:
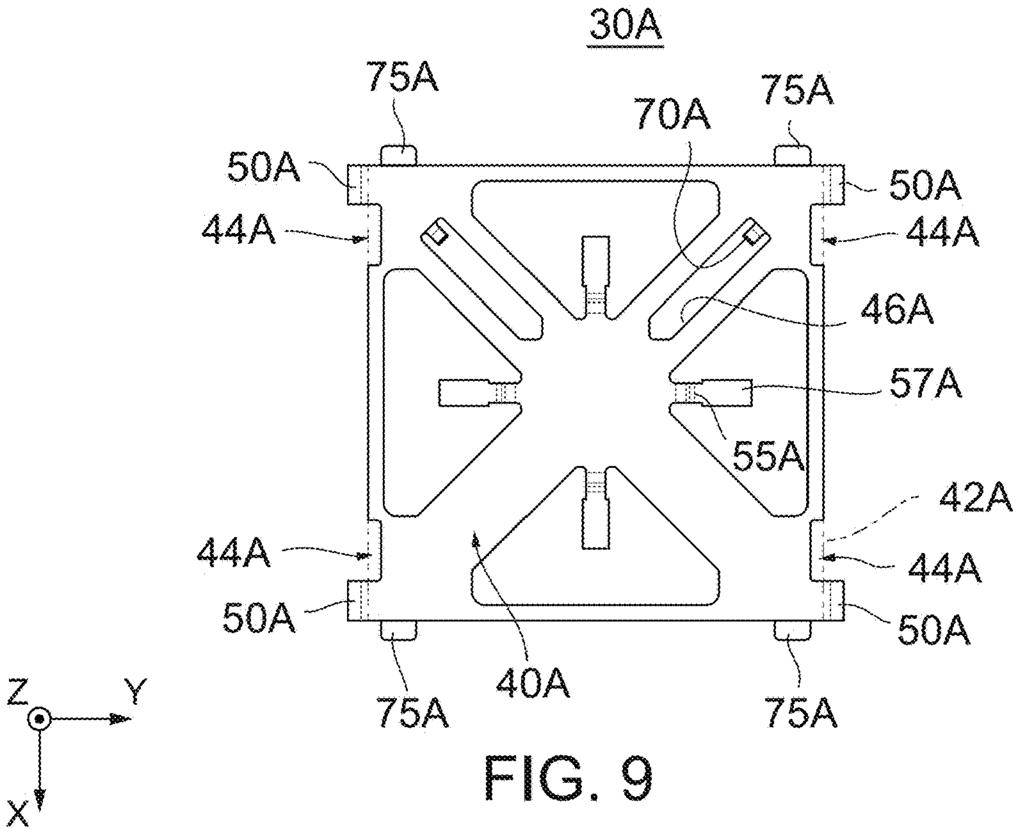
FIG. 9 is a top view showing the antenna element of FIG. 8.

The stamped metal 32A shown therein is a blank which is obtained by punching a metal plate serving as base material. Specifically, the stamped metal 32A has four first portions 34A, four second portions 36A and two third portions 38A in addition to the upper conductor 40A and stubs 75A. Referring to FIGS. 9 and 10, each of the first portions 34A is a portion which is configured to be bent to form the leg 50A. Each of the second portions 36A is a portion which is configured to be bent to form the additional leg 55A. Each of the third portions 38A is a portion which is configured to be bent to form the feeding portions 70A. Similar to the aforementioned first embodiment, the upper conductor 40A of the present embodiment may also be further provided with a dummy slot corresponding to a slot 46A.

Similar to the aforementioned first embodiment, a less amount of scrap is generated from the metal plate when a manufacturer manufactures the antenna elements 30A of the present embodiment by punching them out from the metal plate serving as the base material. Additionally, the antenna element 30A of the present embodiment can have increased design flexibility similar to the aforementioned first embodiment. Although the developed plan of the antenna element 30A has the outer peripheral shape with line symmetry and thereby the antenna element 30A lacks rotational symmetry, a provision of recessed portions 44A and the stubs 75A can appropriately compensate the lack of the rotational symmetry of the antenna element 30A. Accordingly, the antenna device 10A using the antenna element 30A can have improved axial ratio characteristics.

Although the specific explanation about the present invention is made above referring to the embodiments, the present invention is not limited thereto and is susceptible to various modifications and alternative forms without departing from the spirit of the invention.

Although, for example, each of the upper conductors 40, 40A of the aforementioned embodiments has the outer periphery with a substantially rectangular shape, the present invention is not limited thereto. Specifically, the outer periphery of the upper conductor 40, 40A may have another shape, provided that the outer peripheral shape of the upper conductor 40, 40A is line-symmetrical with respect to the line, which passes through the center of the upper conductor 40, 40A, when the upper conductor 40, 40A is viewed in plan view. A substantial shape of the outer periphery of the upper conductor 40, 40A may be, for example, a circle, oval or another polygon. In this case, the shape of the aforementioned specific imaginary rectangle 42, 42A is adjusted to correspond to the substantial shape of the outer periphery of the upper conductor 40, 40A. If the outer periphery of the upper conductor 40, 40A has, for example, a substantially circular shape, a circle that encloses the upper conductor 40, 40A and that is of minimum area should be assumed as a specific imaginary circle corresponding to the specific imaginary rectangle 42, 42A.

Although the antenna elements 30, 30A of the aforementioned embodiments are configured so that the leg 50, 50A protrudes in the orientation that is parallel and opposite to the orientation in which the corresponding recessed portion 44, 44A is recessed, the present invention is not limited thereto. Specifically, the orientation of the leg 50, 50A may not be parallel to and intersect somewhat with the orientation of the corresponding recessed portion 44, 44A, provided that the orientation of the leg 50, 50A is substantially opposite to the orientation of the corresponding recessed portion 44, 44A. If the outer periphery of the upper conductor 40, 40A has, for example, the substantially circular shape, the antenna element 30, 30A may be configured so that the leg 50, 50A protrudes outward in a radial direction of the substantially circular shape while the corresponding recessed portion 44, 44A is recessed inward in the radial direction.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. An antenna element configured to be fixed on a printed circuit board with a ground conductor, wherein:

the antenna element and the printed circuit board form an antenna device when the antenna element is fixed on the printed circuit board;

the antenna element comprises an upper conductor and at least one pair of legs;

when the upper conductor is viewed along an up-down direction, the upper conductor has an outer periphery whose shape is line-symmetrical with respect to a line passing through a center of the upper conductor;

when the upper conductor is viewed along the up-down direction, one of the legs of the pair protrudes in a first orientation while a remaining one of the legs of the pair protrudes in a second orientation;

the first orientation from the center of the upper conductor is opposite to the second orientation from the center of the upper conductor;

each of the legs of the pair extends downward in the up-down direction;

the upper conductor is provided with at least one pair of recessed portions;

the recessed portions of the pair correspond to the legs of the pair in a one-to-one relationship;

when the upper conductor is viewed along the up-down direction, one of the recessed portions of the pair is recessed in the second orientation while a remaining one of the recessed portions of the pair is recessed in the first orientation;

each of the recessed portions is juxtaposed with its corresponding leg in a direction intersecting with a first direction which is defined by the first orientation and the second orientation;

the antenna element comprises two feeding portions; and when the upper conductor is viewed along the up-down direction, an imaginary line connecting the center of the upper conductor with one of the two feeding portions forms a 90 degree angle with an imaginary line connecting the center of the upper conductor with a remaining one of the two feeding portions.

2. The antenna element as recited in claim 1, wherein:

each of the recessed portions has a size in the first direction and another size in a second direction perpendicular to the first direction; and the size of each of the recessed portions in the second direction is greater than the size of each of the recessed portions in the first direction.

3. The antenna element as recited in claim 1, wherein each of the recessed portions is arranged adjacent to its corresponding leg in a second direction perpendicular to the first direction which is defined by the first orientation and the second orientation.

4. The antenna element as recited in claim 1, wherein:

the upper conductor extends in a predetermined plane perpendicular to the up-down direction;

the leg and its corresponding recessed portion are positioned on a same side among four sides of a specific imaginary rectangle;

the specific imaginary rectangle is positioned on the predetermined plane; and the specific imaginary rectangle is a smallest possible rectangle that completely encloses the upper conductor.

5. The antenna element as recited in claim 4, wherein:

the at least one pair of legs includes two pairs each consisting of the legs;

the at least one pair of recessed portions includes two pairs each consisting of the recessed portions;

one of two sides of the specific imaginary rectangle is positioned beyond the center of the upper conductor in the first orientation;

a remaining one of the two sides of the specific imaginary rectangle is positioned beyond the center of the upper conductor in the second orientation; and in each of the two pairs of the legs, one of the legs is positioned on one of the two sides while a remining one of the legs is positioned on a remaining one of the two sides.

6. The antenna element as recited in claim 1, wherein:

the antenna element further comprises at least one pair of stubs;

a third orientation and a fourth orientation define a second direction;

the third orientation from the center of the upper conductor is opposite to the fourth orientation from the center of the upper conductor;

the second direction is perpendicular to the first direction;

one of the stubs of the pair extends in the third orientation from the outer periphery of the upper conductor;

a remaining one of the stubs of the pair extends in the fourth orientation from the outer periphery of the upper conductor; and each of the stubs does not overlap with the upper conductor when the upper conductor is viewed along the up-down direction.

7. The antenna element as recited in claim 6, wherein:

each of the stubs has a size in the first direction and another size in the second direction; and the size of each of the stubs in the first direction is greater than the size of each of the stubs in the second direction.

8. The antenna element as recited in claim 1, wherein:

the printed circuit board has an upper surface facing upward in the up-down direction;

the antenna element further comprises lower conductors;

the lower conductors extend from the legs, respectively;

each of the lower conductors extends, at least in part, in a direction parallel to the upper surface of the printed circuit board; and each of the lower conductors is positioned away from the upper conductor in the up-down direction.

9. The antenna element as recited in claim 1, wherein:

the printed circuit board has an upper surface facing upward in the up-down direction;

the antenna element further comprises at least one pair of additional legs;

each of the additional legs of the pair extends downward in the up-down direction from a location which is closer to the center of the upper conductor than any of the legs;

the antenna element further comprises additional lower conductors;

the additional lower conductors extend from the additional legs, respectively;

each of the additional lower conductors extends, at least in part, in a direction parallel to the upper surface of the printed circuit board; and each of the additional lower conductors is positioned away from the upper conductor in the up-down direction.

10. The antenna element as recited in claim 1, wherein the antenna element is formed from a single metal plate.

11. The antenna element as recited in claim 10, wherein a developed plan of the antenna element has an outer peripheral shape with line symmetry.

12. An antenna device comprising the antenna element as recited in claim 1 and the printed circuit board, wherein:

the printed circuit board has the ground conductor; and the antenna element is fixed on the printed circuit board.

* * * * *